United States Patent [19]

Himmel

[11] Patent Number: 4,570,610
[45] Date of Patent: Feb. 18, 1986

[54] PULSE COMBUSTION BURNER FOR COOKING SURFACE

[75] Inventor: Robert L. Himmel, Cleveland, Ohio
[73] Assignee: Gas Research Institute, Chicago, Ill.
[21] Appl. No.: 687,519
[22] Filed: Dec. 28, 1984
[51] Int. Cl.[4] .............................................. F24C 3/00
[52] U.S. Cl. ...................................... 126/39 E; 431/1; 99/422; 99/447; 126/39 R; 126/39 H; 126/39 K; 126/214 R; 126/214 D
[58] Field of Search ................ 126/39 D, 39 R, 39 E, 126/39 H, 39 N, 39 J, 39 K, 214 A, 214 R, 214 D; 431/1; 99/422, 447

[56] References Cited

U.S. PATENT DOCUMENTS 2,655,913  10/1953  McCammant ................. 126/39 K
3,874,841  4/1975  Ferlin ................................. 126/39 E
4,201,184  5/1980  Scheidler et al. .................. 126/39 J Primary Examiner—Randall L. Green
Attorney, Agent, or Firm—Pearne, Gordon, Sessions, McCoy, Granger & Tilberry

[57] ABSTRACT

A closed top pulse combustion burner for a flat cooking surface. The burner comprises a shallow rectangular box-like combustion chamber with its top providing a cooking surface area. Pulse combustion operation of the burner promotes high thermal efficiency. An internal baffle arrangement in the burner box provides a high degree of temperature uniformity at the cooking surface. The rectangular configuration of the burner unit allows modular construction of multiple burner units which can be individually operated at different times and/or temperatures.

6 Claims, 6 Drawing Figures

PULSE COMBUSTION BURNER FOR COOKING SURFACE

BACKGROUND OF THE INVENTION

The invention relates to closed top burners for cooking surfaces and in particular to a burner of this type that employs pulse combustion operation.

PRIOR ART

Commercial fuel fired closed top cooking surfaces such as those used in restaurants, fast food outlets and the like commonly employ Bunsen-type burners arranged to heat the underside of the cooking surface. Efficiency of these conventional atmospheric burners is inherently limited by their requirement of substantial quantities of excess air needed for full combustion. Standby thermal losses occur when such a burner is not in operation and natural convection currents carry heat away from its surfaces and/or its environment. Additional thermal losses can occur when a power ventilation hood is operated over a burner of this type and hot gases are drawn from its heated surface areas.

SUMMARY OF THE INVENTION

The invention provides a pulse combustion burner for closed top cooking surfaces of commercial ranges, griddles, fry tops and the like which achieves a high thermal efficiency and a high degree of temperature uniformity across the cooking surface. The pulse combustion process occurring in the burner develops a positive flow of gas through a closed combustion chamber. Pressure pulses in the combustion gases create a high degree of turbulence in the burner which is effective to scrub off stagnant gas layers from the internal burner surfaces and thereby achieve high heat transfer with the cooking surface. Since the burner does not rely on natural convection currents for discharge of combustion product gases, thermal losses through the burner during standby or off periods are effectively avoided. Since the combustion chamber of the burner is entirely closed operation of a ventilation hood in the cooking area cannot pull off significant quantities of useful hot gases from the combustion area. A fuel savings of 25% can be achieved with use of a burner of the present invention as compared to the use of conventional atmospheric burners.

As disclosed, the combustion chamber of the burner is in the form of a shallow box with its top formed by a plate which serves as the cooking surface. A mixing head admits combustion gases to the bottom center of the combustion chamber box while combustion products exit through a pair of exhaust pipes connected near a bottom edge of the box. A baffle within the combustion chamber box shields a potentially hot central area of the cooking plate and induces hot gases to flow through potentially cool peripheral areas of the cooking plate. Preferably, the burner box is square or otherwise of simple rectangular shape in plan view. This rectangular modular configuration offers flexibility in product design wherein the burner can be combined in multiple units for heating a relatively large cooking surface. In such a case one or more burner units can be selectively operated depending on the size and/or temperature of the cooking surface needed at a particular time.

DESCRIPTION OF THE PREFERRED EMBODIMENT

Figure 1:
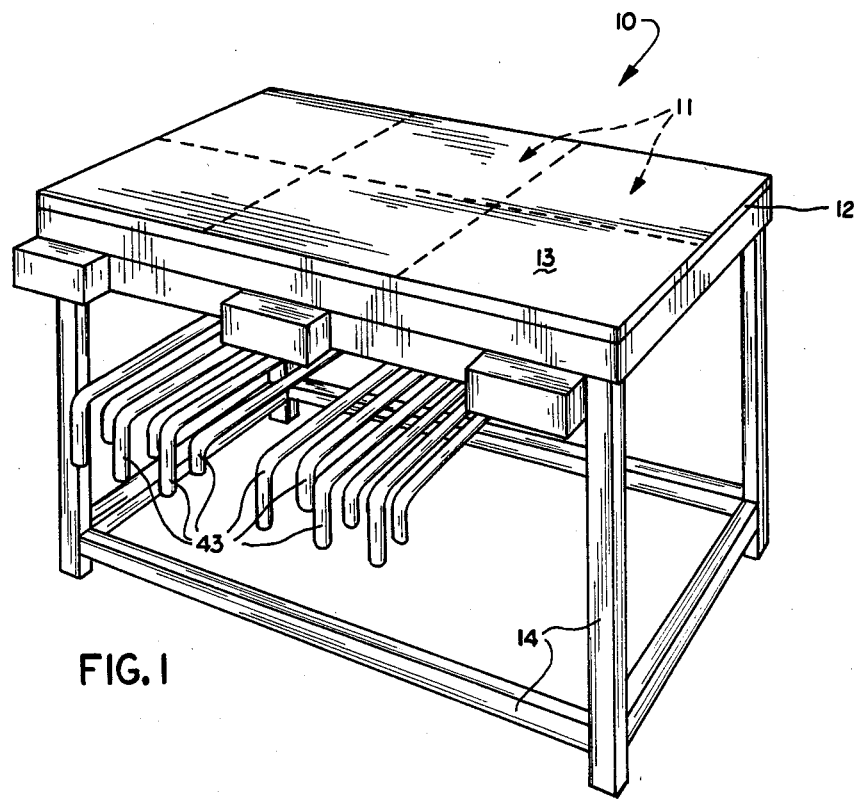
FIG. 1 is a perspective view of a commercial flat top cooking surface constructed in accordance with the invention.
Figure 2:
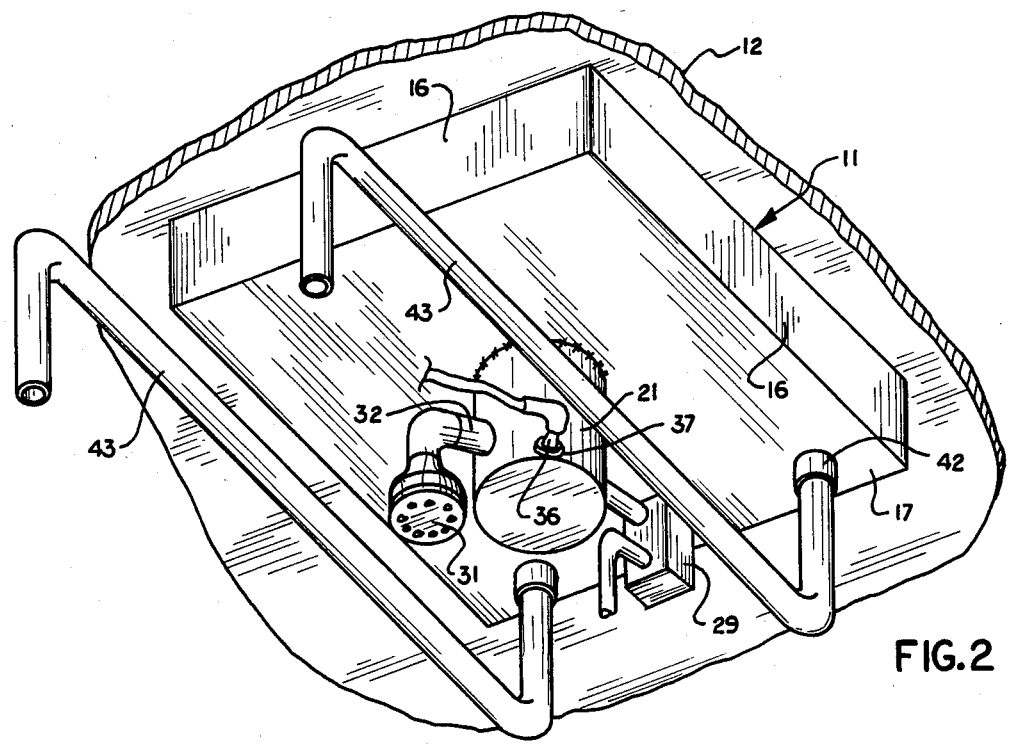
FIG. 2 is a fragmentary isometric view of the underside of a typical one of the burners of the range of FIG. 1.
Figure 3:
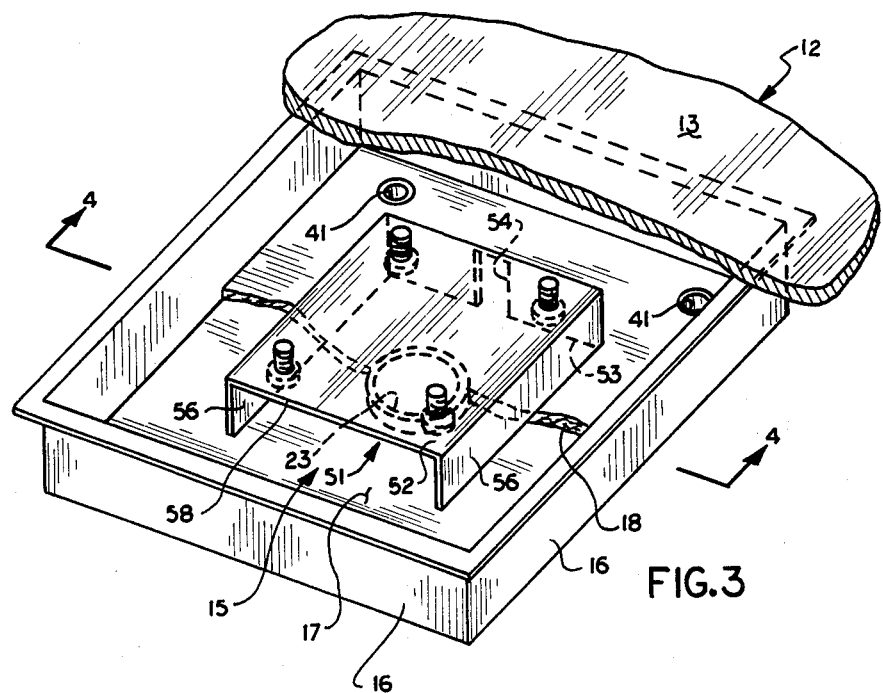
FIG. 3 is a fragmentary isometric view of the upper side of the typical range burner.
Figure 4:
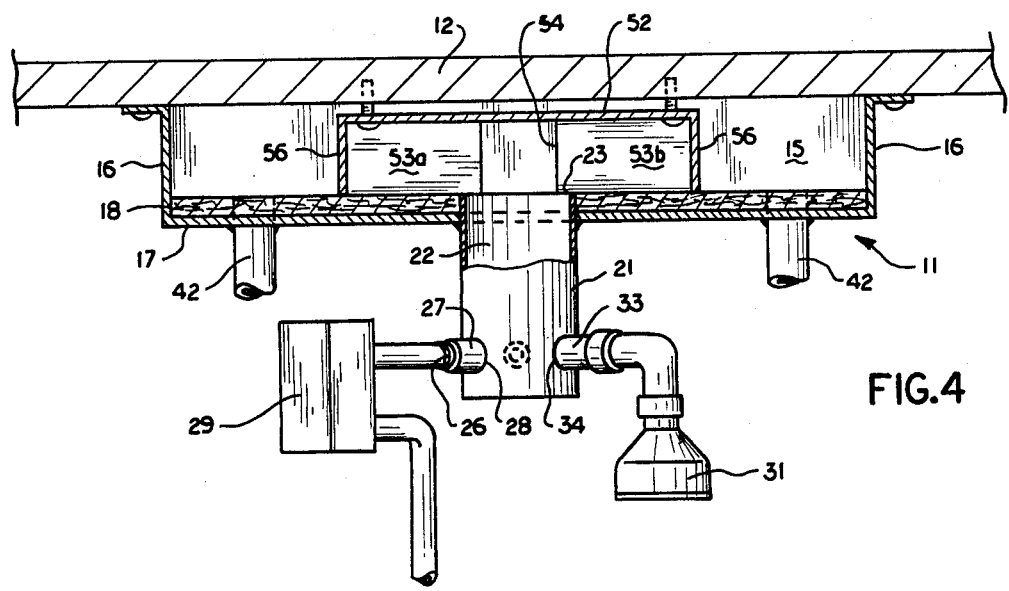
FIG. 4 is a vertical cross-sectional view taken along the line 4—4 indicated in FIG. 3 of the typical burner.

Referring now to the drawings there is shown a commercial flat top cooking appliance 10 suitable for cooking and like use in a restaurant, fast food outlet or other high use facility. In the illustrated case, the appliance 10 has a plurality of closed top burners 11 arranged in a rectangular array. The burners 11, which are substantially identical, are mounted on a common rectangular horizontal plate 12 formed of $\frac{5}{8}''$ steel stock, for example. An upper face 13 of the plate provides the cooking surface of the range. The nominal size of each of the illustrated burners 11, in plan view, is one foot square so that with the burners arranged in a two by three array, the plate 12 is approximately 2' by 3' in its planar dimensions. The plate 12 is supported at convenient counter height by a frame 14 fabricated of steel angle stock. The frame 14 can be covered with suitable cabinetry.

A typical burner 11 has the general form of a shallow square box with four sides 16 and a bottom 17. The panels forming the sides 16 and bottom 17 are fabricated of $\frac{1}{8}''$ cold roll steel, for example. The sides 16 and bottom 17 are joined together in an air tight manner such as by welding. An overlying portion of the cooking plate 12, which forms the top of the burner box, is joined to these burner box sides 16 also in an air tight manner such as by continuous welding. The upper side of the burner bottom panel 17 is covered with a layer of thermal insulation 18 such as ceramic fiber paper marketed under the registered trademark Fiberfrax. The lower exterior side of the burner panel 17 can be covered with fiberglass batting insulation (not shown).

Figure 6:
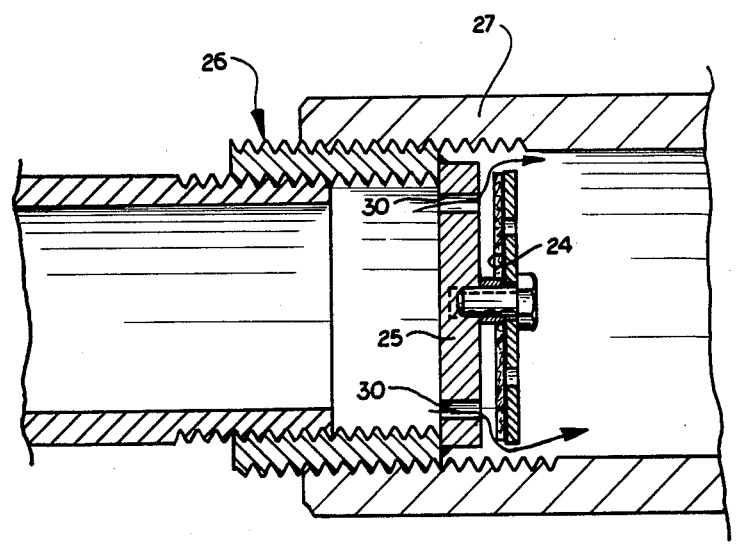
FIG. 6 is a schematic cross-sectional view of a gas valve.

Centrally located on the burner bottom panel 17 is a gas mixer head 21 conveniently formed, for example, by $1\frac{1}{2}''$ steel pipe seal welded at one end to the bottom panel and closed off at its other end by a steel plate. The mixer head 21 forms an internal chamber 22 that is open to the interior of the burner box 11 through a central inlet aperture 23 in the bottom panel 17. This aperture 23 is equal in size to the inside diameter of the chamber 22 and allows free passage of gas from the chamber. Fuel, such as natural gas, is delivered from a source (not shown) through a one way or flapper valve 26. The valve 26 is connected to the mixer chamber 22 through a pipe coupling 27 seal welded to the mixer head 21 at a port 28 through the sidewall of the head 21. The gas valve 26, illustrated in FIG. 6, is of a generally known construction and operation. Pressure of the gas supply, typically in the order of $1\frac{1}{2}$ to $2''$ of water column, displaces a thin gas impervious annular membrane 24 from a wall 25 to uncover ports 30 and allow fuel gas flow in the direction of the arrows into the mixing chamber 22. Pressure pulses occurring during combustion in the mixing chamber 22 cause the membrane or flapper 24 to seat against the wall 25 and prevent return flow of gas through the ports 30. A gas decoupler chamber 29 is disposed in the gas supply circuit upstream of the flapper valve 26.

Figure 5:
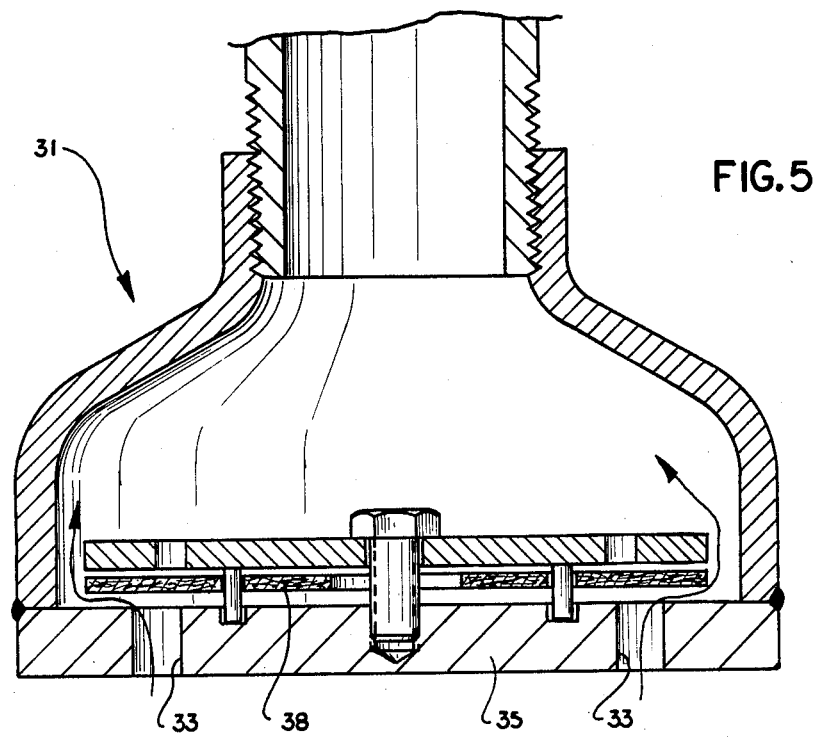
FIG. 5 is a schematic cross-sectional view of an air valve.

Air is delivered to the mixing chamber 22 through a one way flapper valve 31 connected to a pipe nipple 32 seal welded to the mixer head 21 at a port 34 through the mixing chamber sidewall. The air valve 31 is diagrammatically illustrated in FIG. 5. Air is admitted into the interior of the valve 31 through a plurality of apertures 33 in an end wall 35. During operation of the burner 11, sub-atmospheric pressure pulses are created and a flapper membrane 38 allows air to flow through the apertures 33 into the valve 31. Reverse air flow during positive phases of the pressure pulses is prevented by seating of the membrane 38 against the wall 35. A spark plug 36 is received in an internally threaded boss 37 formed on the sidewall of the mixer head 21 and projects into the chamber 22 for igniting gas therein.

Adjacent a pair of adjoining corners of the bottom panel 17 are a pair of exhaust ports 41. The ports 41 are circular apertures which communicate with pipe couplings 42, in the illustrated case ¾" pipe couplings, seal welded at the lower surface of the bottom panel 17. The exhaust ports or apertures 41 have a diameter substantially equal to the inside diameters of the couplings 42. A separate tailpipe 43 is connected to each of the exhaust port couplings 42. In the illustrated case, these tailpipes are ½" standard steel pipe approximately 22" in length.

A baffle 51 shrouds the gas inlet opening or aperture 23 in the burner box 11. The baffle 51 has the general configuration of a shallow square box horizontally centered within the burner box 11. An upper side 52 of the baffle box 51 is imperforate and is spaced slightly, for example ⅛" from the underside of the cooking plate 12. A lower side of the baffle box 51 is formed by the central region of the lower or bottom burner panel 17 and insulation layer 18. A vertical end wall 53 of the baffle box 51 adjacent the exhaust ports 41 comprises two sections 53a, 53b spaced by a rectangular opening 54. A pair of opposed imperforate walls 56 forming the sides of the baffle box 51 extend perpendicularly from the plane of these spaced sections 53a, 53b. A side of the baffle box 51 opposite the spaced sections 53a, 53b is substantially completely open.

In use of the appliance 10, one or more of the burners 11 is operated depending on the cooking surface area and/or distinct temperature levels required at a particular time. For each burner 11, suitable controls responsive to a thermostat sensing the temperature of the area of the cooking plate 12 associated with such burner supply natural gas or other fuel to its flapper valve 26. The controls also energize the spark plug 36 to initiate combustion in the mixer head chamber 22. A start-up blower and suitable ducting (not shown) can be provided to direct a temporary blast of air towards the air valve end wall 35 to purge the air valve 31 and otherwise promote favorable burner starting conditions.

Once initiated, combustion occurs in cyclic pulses within a combustion chamber 15 formed by the burner box 11. The combustion chamber 15 and the tailpipes 43 operate as a quasi-Hemholtz resonator. The combustion process is self supporting, once initiated, so that any start-up blower and the spark plug 36 may be de-energized. The combustion pulses generate positive pressure waves in the combustion chamber 15 which are effective to expel burned gases out of the combustion chamber through the tailpipes 43. The flapper valves 26, 31 permit the flow of gases only into the mixer chamber 22 and restrict reverse flow through their respective bodies.

The baffle 51 achieves a relatively high degree of temperature uniformity on the overlying area of the cooking plate surface 13. The upper plate or face 52 of the baffle 51 shields the central zone of the overlying area of the plate 12 from direct impingement of and radiation from the flame formed in the primary combustion zone immediately adjacent the central aperture 23. At the same time, this upper plate 52 and the baffle sides 56, 53 cooperate to channel or direct hot combustion gases exiting the mixer chamber 22 horizontally away from the exhaust ports 41. The baffle end walls 53a, 53b by limiting the size of the intervening opening 54 restrict the volume of hot gases that can travel the relatively shorter more direct path from the aperture 23 through the opening 54 to the exhausts 41.

The result of causing a significant volume of combustion gases to follow the indirect route from the mixer head aperture 23 through the fully open baffle side 58 remote from the exhaust ports 41 is to develop uniform heating of the peripheral zones of the cooking plate 12 overlying the burner box 11. By way of example, a burner unit of the general construction described above has demonstrated a relatively even temperature distribution across its upper surface of + or −25° F. from a set point of 350° F.

The disclosed burner, which has a nominal rating of 10,000 BTU/hr., achieves a high degree of thermal efficiency in the order of 60% as a result of the highly turbulent flow of gas through the combustion chamber 15 which is incident to the rapidly changing flow rate associated with pulse combustion. As can be understood from the foregoing description, the combustion chamber 15 is completely enclosed and this containment reduces the amount of hot gas which can be drawn away from the burner by a ventilation hood overlying the cooking appliance 10. It can also be understood that standby losses, when the burner is not operating, are at a minimum since natural drafts through the burner do not occur.

Although the preferred embodiment of this invention has been shown and described, it should be understood that various modifications and rearrangements of the parts may be resorted to without departing from the scope of the invention as disclosed and claimed herein.

What is claimed is:

1. A cooking appliance having a flat cooking surface and a pulse combustion burner for heating the cooking surface, the burner comprising a closed shallow combustion chamber formed by intersecting walls, a top of the combustion chamber being in heat transfer relation to the cooking surface, an inlet aperture in a wall of the combustion chamber, gas valve means for supplying a flow of combustible gas to the combustion chamber through the inlet aperture means and restricting reverse flow, means for igniting the combustible gas delivered to the combustion chamber by the gas valve means, outlet aperture means in a wall of the combustion chamber, tailpipe means connected to the outlet aperture means for receiving combusted gases from the combustion chamber, and baffle means in said combustion chamber to shield an area of the combustion chamber associated with the cooking surface adjacent said inlet means from excessive heat transfer from a primary combustion zone immediately upstream of said inlet aperture means.

2. An appliance as set forth in claim 1, wherein said baffle means includes means to direct flow of combustion gases around peripheral areas of the combustion chamber.

3. A cooking appliance having a flat cooking surface, a pulse combustion burner for heating the cooking surface, the burner comprising a closed shallow box combustion chamber having bottom, side and top walls, the top wall being formed by a plate providing said cooking surface at its upper side, a mixer head communicating with the combustion chamber through an inlet aperture generally centrally disposed in the bottom combustion chamber wall, gas valve means for supplying combustible gases to the mixer chamber and preventing reverse flow through such valve means, means for igniting combustible gases supplied to the mixer head, tailpipe means communicating with the combustion chamber through exhaust port means in the bottom wall of the combustion chamber adjacent one of the sides of the combustion chamber, and baffle means overlying the inlet aperture, said baffle means being arranged to shield the central region of the combustion chamber top wall from direct exposure to a primary combustion zone at said inlet aperture and promoting flow of combustion gases away from said inlet aperture first towards a side of said combustion chamber opposite said exhaust port means and then peripherally of said combustion chamber and then towards said exhaust port means.

4. An appliance as set forth in claim 3, wherein said baffle means comprises a generally rectangular box substantially centrally disposed within said combustion chamber.

5. An appliance as set forth in claim 4, wherein said baffle box has a restricted opening in a side adjacent said exhaust port means and has a generally fully open side remote from said exhaust port means.

6. An appliance as set forth in claim 5, wherein a top of said baffle box is vertically spaced a limited distance from the top wall of said combustion chamber.

* * * * *